(12) United States Patent
Nakahara et al.

(10) Patent No.: US 10,995,629 B2
(45) Date of Patent: May 4, 2021

(54) VARIABLE NOZZLE MECHANISM AND ROTATING MACHINE INCLUDING THE SAME

(71) Applicant: MITSUBISHI HEAVY INDUSTRIES, LTD., Tokyo (JP)

(72) Inventors: Yuya Nakahara, Tokyo (JP); Tatsuya Ishizaki, Tokyo (JP); Noriyuki Hayashi, Tokyo (JP); Toyotaka Yoshida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 101 days.

(21) Appl. No.: 16/200,934

(22) Filed: Nov. 27, 2018

(65) Prior Publication Data

US 2019/0162075 A1 May 30, 2019

(30) Foreign Application Priority Data

Nov. 30, 2017 (JP) .............................. JP2017-231107

(51) Int. Cl.
*F01D 17/16* (2006.01)
*F02B 37/22* (2006.01)
*F01D 9/04* (2006.01)

(52) U.S. Cl.
CPC ........... *F01D 17/16* (2013.01); *F01D 17/165* (2013.01); *F02B 37/22* (2013.01); *F01D 9/048* (2013.01); *F05D 2220/40* (2013.01); *F05D 2250/314* (2013.01)

(58) Field of Classification Search
CPC ......... F01D 17/16; F01D 17/165; F02B 37/24
See application file for complete search history.

(56) References Cited

U.S. PATENT DOCUMENTS

| 9,429,033 | B2 | 8/2016 | Martin et al. | |
|---|---|---|---|---|
| 2010/0202874 | A1 | 8/2010 | Hayashi et al. | |
| 2014/0248137 | A1 | 9/2014 | Inoue et al. | |
| 2015/0132111 | A1 | 5/2015 | Martin et al. | |
| 2015/0211538 | A1* | 7/2015 | Aiba ...................... | F02M 26/00 415/146 |
| 2015/0354444 | A1* | 12/2015 | Hayashi ................... | F02C 6/12 415/148 |
| 2018/0340467 | A1 | 11/2018 | Nagayo et al. | |

FOREIGN PATENT DOCUMENTS

| EP | 2762698 A1 | 8/2014 |
|---|---|---|
| EP | 3 045 677 A1 | 7/2016 |
| JP | 4875602 B2 | 2/2012 |
| JP | 2013-117187 A | 6/2013 |
| WO | WO 2016/135846 A1 | 9/2016 |

* cited by examiner

*Primary Examiner* — Justin D Seabe
*Assistant Examiner* — Michael L Sehn
(74) *Attorney, Agent, or Firm* — Birch, Stewart, Kolasch & Birch, LLP

(57) ABSTRACT

A variable nozzle mechanism in which a nozzle mount has a first surface which has a minimum clearance in a direction of an axis with respect to a lever side facing surface in an opposing region facing the lever side facing surface in the direction of the axis, and a second surface which is disposed adjacent to the first surface in a circumferential direction of the nozzle mount and has a clearance in the direction of the axis with respect to the lever side facing surface larger than the clearance in the direction of the axis between the first surface and the lever side facing surface.

9 Claims, 6 Drawing Sheets

VARIABLE NOZZLE MECHANISM AND ROTATING MACHINE INCLUDING THE SAME

BACKGROUND OF THE INVENTION

Field of the Invention

The present invention relates to a variable nozzle mechanism and a rotating machine including the variable nozzle mechanism. Priority is claimed on Japanese Patent Application No. 2017-231107, filed Nov. 30, 2017, the content of which is incorporated herein by reference.

Description of Related Art

A variable nozzle mechanism is provided in a rotating machine such as a turbocharger (a variable capacity type turbocharger) which operates by receiving a dynamic pressure of a fluid and is used for controlling a flow rate of the fluid which contributes to the operation.

For example, the variable nozzle mechanism used in the turbocharger can change a supercharging pressure in accordance with an output fluctuation of an engine. As a mechanism for changing the supercharging pressure of the turbocharger, ones that regulate energy of an exhaust gas flow recovered in a turbine mainly using a valve or a nozzle are known. Among them, one that uses the variable nozzle mechanism has an advantage of excellent controllability.

Since the variable nozzle mechanism used for the turbocharger as described above is configured to have a movable portion which moves a plurality of nozzle blades simultaneously, wear and sticking problems tend to occur. Although these problems can also be solved by manufacturing with a material having excellent wear resistance, a solution in terms of structural improvement is desirable from the perspective of manufacturing cost. As an example of such a variable nozzle mechanism, for example, one having a configuration as disclosed in Patent Document 1 is known.

[Patent Document 1] Specification of U.S. Patent Application Publication No. 2015/0132111

SUMMARY OF THE INVENTION

On the other hand, the nozzle parts are particularly worn out during the time period when the nozzle is opened wide. This type of operation is performed when the engine is operating at a high engine speed, and strong vibrations due to the engine speed and high-temperature exhaust gases becomes a main cause of wear.

However, in the variable nozzle mechanism of a compressor described in Patent Document 1, the wear resistance is sometimes insufficient from the perspective of the wear of the mechanism when operating at a constant and large opening.

The present invention provides a variable nozzle mechanism which has excellent wear resistance while suppressing costs and a rotating machine including the variable nozzle mechanism.

A variable nozzle mechanism according to one aspect of the present invention includes: a first annular member; a plurality of nozzle vanes which are provided to face the first annular member, disposed in an annular fluid flow channel for guiding a working fluid from a scroll flow channel formed on an outer circumferential side of a turbine rotor to the turbine rotor, rotatable relative to the first annular member, and configured to adjust the flow passage area of the fluid flow channel; a plurality of vane shafts which are inserted through support holes penetrating through the first annular member and support the respective nozzle vanes one by one; a plurality of levers which are disposed outside the fluid flow channel and extend from the respective vane shafts radially outward of the first annular member; and a second annular member which is provided to be rotatable with respect to the first annular member around a central axis of the first annular member to support the plurality of levers, and rotates the nozzle vanes together with the levers relative to the first annular member, wherein each of the levers has a lever side facing surface which faces the first annular member in the direction of the central axis, and the first annular member has a first surface which has a minimum clearance in the direction of the central axis with respect to the lever side facing surface in an opposing region that faces the lever side facing surface in the direction of the central axis, and a second surface which is disposed adjacent to the first surface in a circumferential direction of the first annular member and has a clearance in the direction of the central axis with respect to the lever side facing surface greater than the clearance in the direction of the central axis between the first surface and the lever side facing surface.

According to this configuration, when the plurality of nozzle vanes are arranged at the position that maximizes the flow passage area of the fluid flow channel, that is, at the position of full opening, the clearance between the first annular member and the lever side facing surface can be minimized by the first surface. Thus, vibrations which are caused by the force of the fluid received by the nozzle vane and are transmitted through the vane shaft can be suppressed by the first surface at least at the position of full opening. As a result, the wear between the second annular member and the lever is suppressed by reducing a slip amount in a portion where the second annular member supports the lever, especially when it is operated at a maximum opening, which was a case in which wear was easily caused. Furthermore, since the clearance between the lever side facing surface and the first annular member can be increased by the second surface adjacent to the first surface, it is possible to reduce the risk of adhesion between the first annular member and the lever at least at a position other than full opening.

Also, in the variable nozzle mechanism described above, the first surface and the second surface may be arranged alternately in the circumferential direction so as to form an annular shape.

According to this configuration, it is possible to process a region for reducing the clearance between the first annular member and the lever side facing surface using a simpler process in an opposing region on the first annular member opposed to the lever side facing surface.

Also, in the variable nozzle mechanism described above, a recessed portion which is recessed in the direction of the central axis may be provided in the opposing region of the first annular member, and the second surface may be provided on an inner surface of the recessed portion.

According to this configuration, the second surface can be provided on the first annular member by only providing a groove in the first annular member without adding a new member. As a result, the first surface can be easily provided on the first annular member at the position without the recessed portion, whereby the clearance between the first annular member and the lever side facing surface can be made small at least at the position of full opening.

Also, in the variable nozzle mechanism described above, a protruding portion which protrudes in the direction of the central axis and is separate from or integral with the first annular member may be provided in the opposing region of the first annular member, and the first surface may be provided on a surface of the protruding portion.

According to this configuration, the protruding portion provided with the first surface can be manufactured as a separate component from the first annular member. In this case, even when the wear of the protruding portion progresses, the performance can be recovered by replacing only the protruding portion.

Also, in the variable nozzle mechanism described above, the lever may further include an engaging portion which is engaged with and supported by the second annular member at an outer end portion in the radial direction, and the lever side facing surface may be provided in the engaging portion.

According to this configuration, it is possible to effectively suppress the vibrations of the engaging portion, which is the portion where the amplitude of vibrations is largest among the levers.

Also, in the variable nozzle mechanism described above, the lever may further include: an engaging portion which is engaged with and supported by the second annular member at an outer end portion in the radial direction, and a fixing portion which fixes the vane shaft at an inner end portion in the radial direction, and the lever side facing surface may be provided between the engaging portion and the fixing portion.

According to this configuration, since the lever side facing surface is provided inward in the radial direction of the lever as compared with the engaging portion, the processing area (installation area) of the first surface provided for suppressing the vibrations transmitted through the vane shaft becomes relatively small. Therefore, it is possible to obtain the wear resistance effect by only processing the relatively narrower region.

Also, in the variable nozzle mechanism described above, the first surface may be provided along the lever side facing surface, and the second surface may gradually come close to the lever side facing surface to be connected to the first surface as it goes toward a front side in a rotational direction of the second annular member which is a direction in which an opening of the nozzle vane increases.

According to this configuration, since the first surface and the second surface can be connected to be continuous, the lever side facing surface is not caught by the first annular member, and the mechanism can be operated more smoothly.

A rotating machine according to one aspect of the present invention includes the variable nozzle mechanism described above.

According to the variable nozzle mechanism and the rotating machine including the variable nozzle mechanism of the present invention, it is possible to further improve the wear resistance while suppressing the cost.

DETAILED DESCRIPTION OF THE INVENTION

First Embodiment

Hereinafter, a variable nozzle mechanism 11 according to a first embodiment of the present invention and a variable capacity type turbocharger 1 (hereinafter simply referred to as a turbocharger 1) which is a rotating machine including the variable nozzle mechanism 11 will be described in detail with reference to the drawings.

Figure 1:
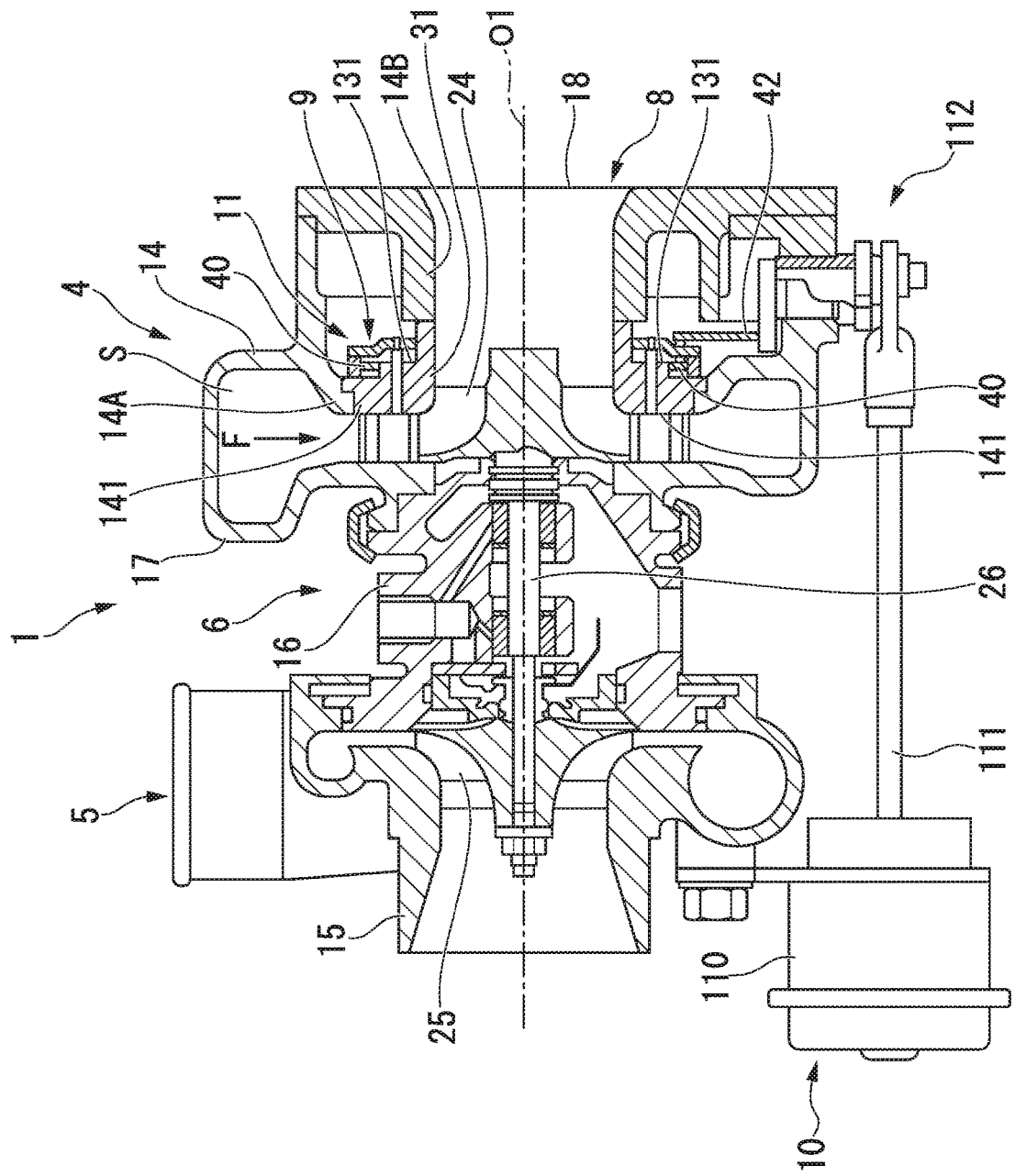
FIG. 1 is a longitudinal cross-sectional view of a turbocharger having a variable nozzle mechanism according to a first embodiment of the present invention.

First, a configuration of the turbocharger 1 according to the first embodiment of the present invention will be described. FIG. 1 is an overall configuration diagram showing a turbocharger 1 having a variable nozzle mechanism 11 according to the present embodiment.

The turbocharger 1 according to the present embodiment includes a turbine section 4 which has a turbine casing 14 and a turbine rotor 24 in the turbine casing 14, a compressor section 5 which has a compressor housing 15 and a compressor wheel 25 in the compressor housing 15, a shaft section 6 which has a bearing housing 16 and a turbine shaft 26 in the bearing housing 16, and an operation section 10 for operating a mechanism in the turbine section 4.

The turbine shaft 26 is supported by the bearing housing 16 to be rotatable about a rotational axis (axis O1). The turbine rotor 24 and the compressor wheel 25 are fixedly connected to both ends of the turbine shaft 26, and the turbine rotor 24 and the compressor wheel 25 are configured to rotate simultaneously and in the same direction in conjunction with each other. As an example, the turbine rotor 24 is of a radial flow type.

The turbine casing 14 is provided to cover a periphery of the turbine rotor 24 and is integrally connected to the bearing housing 16.

Similarly, the compressor housing 15 is also provided to cover a periphery of the compressor wheel 25. The compressor housing 15 is integrally connected to the bearing housing 16 on an opposite side from the side connected to the turbine casing 14 in a direction of the axis O1 in the bearing housing 16.

In addition to the turbine rotor 24, the turbine section 4 has a scroll 17 integrally formed with the turbine casing 14, an exhaust gas outlet portion 8, and a variable nozzle mechanism 11 provided inside the turbine casing 14.

The scroll 17 is provided to extend in a circumferential direction of the turbine rotor 24 to surround the turbine rotor 24 from an outer periphery thereof. The scroll 17 forms a space S (a scroll flow channel) of a predetermined volume between a wall of the turbine casing 14 forming the scroll 17 and the turbine rotor 24. The scroll 17 includes an inlet (not shown) for an exhaust gas (a working fluid). The scroll 17 guides the exhaust gas introduced from the exhaust gas inlet to the space S extending in a circumferential direction of an outer circumference of the turbine rotor 24. In this way, the turbine rotor 24 receives the exhaust gas flow F which is fed while swirling around the axis O1 over the entire circumference in the circumferential direction.

The exhaust gas outlet portion 8 is provided in the turbine casing 14 on a side opposite to the compressor wheel 25 in the direction of the axis O1. The exhaust gas flow F flows in from an outer circumferential side of the turbine rotor 24, flows in the radial direction toward the center side thereof, and performs expansion work on the turbine rotor 24. Then, the exhaust gas flow F flows out in the direction of the axis O1 and is guided to an exhaust gas outlet 18 by the exhaust gas outlet portion 8 to be delivered to an outside of the machine.

Figure 2:
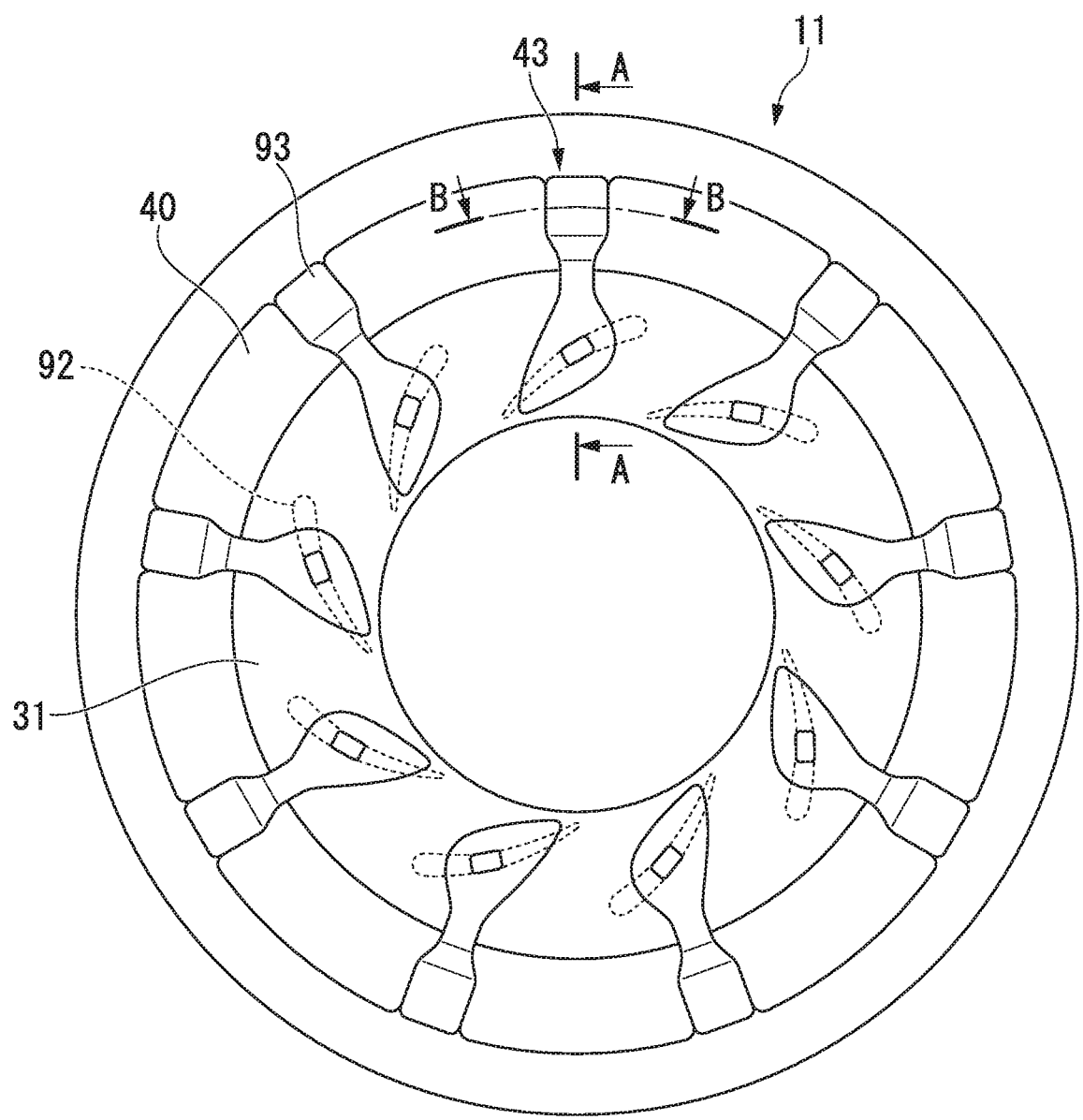
FIG. 2 is a plan view of the variable nozzle mechanism according to the first embodiment of the present invention.

Hereinafter, the configuration of the variable nozzle mechanism 11 will be described in detail with reference to FIGS. 1 and 2.

The variable nozzle mechanism 11 includes a nozzle mount (a first annular member) 31, a drive ring (a second annular member) 40, and a vane portion 9.

The nozzle mount 31 is substantially disc-shaped and has an annular shape with a circular opening at the center thereof. The nozzle mount 31 is provided to be connected to both a turbine casing first partition wall 14A which is a part of a member forming the scroll 17 in the turbine casing 14 and a turbine casing second partition wall 14B forming the exhaust gas outlet portion 8. That is, a passage (a fluid flow channel) of the exhaust gas flow F is formed by the configuration in which an inner wall surface of the scroll 17, a wall surface on a side of the exhaust gas flow F passage of the nozzle mount 31 (a second board surface 141), and an inner wall surface of the exhaust gas outlet portion 8 are connected in series in that order.

Also, in the nozzle mount 31, a plurality of support holes 41 which penetrate the nozzle mount 31 in the thickness direction from a first board surface 131 which is a board surface connected to the exhaust gas outlet portion 8 to the second board surface 141 which is a board surface on the other side are continuously formed. In the present embodiment, for example, nine such support holes 41 are provided.

The drive ring 40 is supported on the first board surface 131 and is provided in a space that is not exposed to the exhaust gas. The drive ring 40 is an annular member and shares the central axis (axis O1) with the nozzle mount 31. In addition, the drive ring 40 is relatively rotatable around the central axis with respect to the nozzle mount 31.

The vane portion 9 has a plurality of vane shafts 91, a plurality of nozzle vanes 92, and a plurality of levers 93.

The vane shafts 91 are inserted into the support holes 41 one by one to pass through the support holes 41 of the nozzle mount 31, and are provided to penetrate from the first board surface 131 side to the second board surface 141 side. Each vane shaft 91 is supported by the support hole 41 to be relatively rotatable with respect to the nozzle mount 31 with the center axis of the support hole 41 as a rotational axis (a shaft rotation axis).

Each nozzle vane 92 is fixed to one end of each vane shaft 91 and is provided on the second board surface 141 side of the nozzle mount 31. As described above, since the second board surface 141 of the nozzle mount 31 forms the wall surface on the passage side of the exhaust gas flow F of the nozzle mount 31, the nozzle vane 92 is provided midway in the passage of the exhaust gas flow F. Since the nozzle vanes 92 are fixed in a one-to-one relationship with the respective vane shafts 91, nine nozzle vanes 92 are included in the present embodiment. These nine nozzle vanes 92 are provided to surround the outer circumference of the turbine rotor 24, and the exhaust gas flow F sent from a space of the scroll 17 passes through gaps of the nozzle vanes 92 and flows to the turbine rotor 24. The nozzle vanes 92 are provided to be rotatable with respect to the nozzle mount 31, and are capable of adjusting a flow passage area of the exhaust gas flow F.

Each lever 93 is a plate-shaped member which extends in a radial direction of the nozzle mount 31. One end of each lever 93 is engaged with the drive ring 40 at an engaging portion 43. The other end of each lever 93 is fixed to the other end of the vane shaft 91. With this, the lever 93 interlocks relative rotation of the drive ring 40 and relative rotation of the vane shaft 91.

The engaging portion 43 is provided at a radially outer end portion of the lever 93 to be engaged with a recessed portion 44 provided in the drive ring 40. The recessed portions 44 are formed radially inward from the outer circumferential side of the drive ring 40 and are provided equal in number to the levers 93 at approximately equal intervals in the circumferential direction of the drive ring 40. More specifically, the engaging portion 43 is provided to protrude toward the first board surface 131 at the end of the lever 93 on the side where the vane shaft 91 is not provided. The engaging portion 43 is engaged so as to be accommodated in the recessed portion 44, and restrains movement of the drive ring 40 in the rotational direction (circumferential direction).

The configuration of the engaging portion 43 with respect to the first board surface 131 will be described later.

Hereinafter, a mechanism for interlocking the drive ring 40 and the lever 93 will be described in more detail with reference to FIG. 2. In the plan view of the first board surface 131 of the nozzle mount 31, when the drive ring 40 relatively rotates in the clockwise direction, the lever 93 also tilts while rotating in the clockwise direction around the rotational axis of the vane shaft 91 as the engaging portion 43 of the lever 93 is pulled by the drive ring 40. As a result, the vane shaft 91 fixed to the lever 93 and the nozzle vane 92 fixed to the vane shaft 91 also rotate in the clockwise direction. Since the nine vane portions 9 have the same configuration, similar behaviors occur in all of the nine vane portions 9.

As described above, the variable nozzle mechanism 11 according to the present embodiment rotates the plurality of nozzle vanes 92 provided on the outer circumference of the turbine rotor 24 at once due to the relative rotational motion of the drive ring 40. Thereby the variable nozzle mechanism 11 having a function of uniformly adjusting the flow rate (opening of the flow passage) of the exhaust gas flow F over the entire outer circumference of the turbine rotor 24.

The operation section 10 is provided for operating the variable nozzle mechanism 11 from the outside of the turbine casing 14. The operation section 10 includes an actuator 110, an actuator rod 111, and a conversion mechanism 112.

The actuator 110 is a driving device that causes the actuator rod 111 to reciprocate in the direction of the axis O1 by means of electromagnetic force or the like. The actuator rod 111 also extends in the direction of the axis O1. The conversion mechanism 112 is connected to a tip of the actuator rod 111 on the other side opposite to one side connected to the actuator 110.

The conversion mechanism 112 is provided such that a part thereof is inserted into a gap provided in the turbine casing 14 and is connected to the drive ring 40 inside the turbine casing 14 via a pin. The conversion mechanism 112 converts a reciprocating motion of the actuator 110 in the direction of the axis O1 into a motion of pushing and pulling the pin 42, whereby the drive ring 40 rotates relative to the nozzle mount 31 while being pulled by the pin 42. As a result, the variable nozzle mechanism 11 operates by adjusting the reciprocating motion of the actuator 110 and an amount of the exhaust gas flow F is regulated.

In the present embodiment, the lever 93 has a lever side facing surface 901 that faces the first board surface 131 of the nozzle mount 31. A first surface 61 and a second surface 71 are provided in an opposing region of the first board surface 131 of the nozzle mount 31 that the lever side facing surface 901 faces.

Hereinafter, with reference to FIG. 3, FIG. 4, and FIG. 5, a main part of the variable nozzle mechanism 11 according to the present embodiment will be described in detail.

Figure 3:
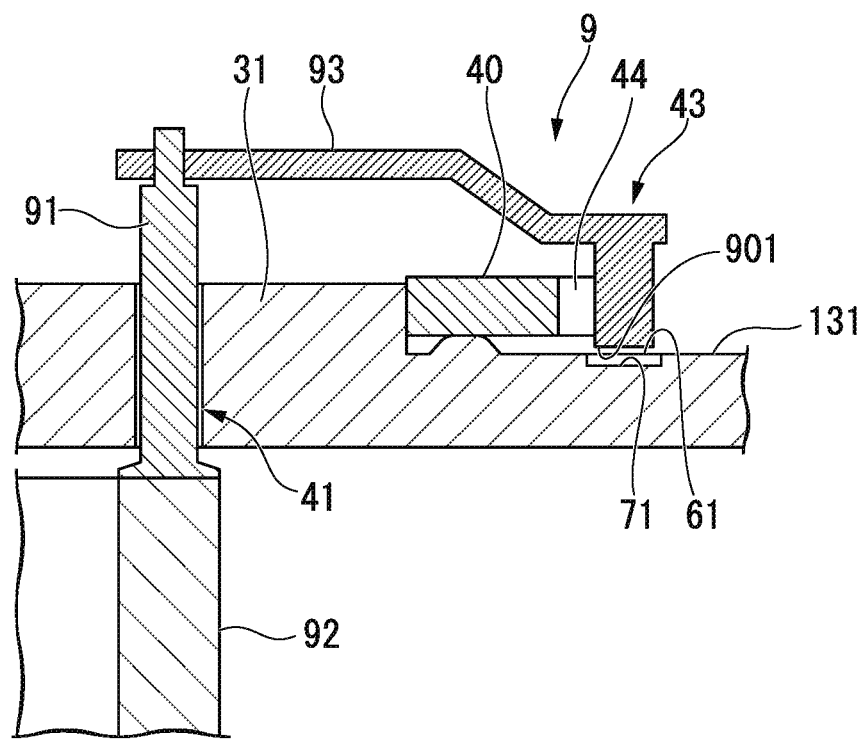
FIG. 3 is a cross-sectional view of the variable nozzle mechanism according to the first embodiment of the present invention taken along the line A-A in FIG. 2.
Figure 4:
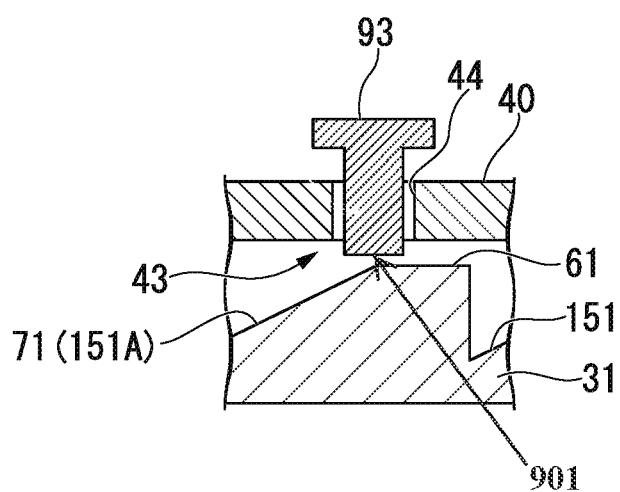
FIG. 4 is a cross-sectional view of the variable nozzle mechanism according to the first embodiment of the present invention taken along the line B-B in FIG. 2.

As shown in FIGS. 3 and 4, the lever side facing surface 901 is provided on the engaging portion 43 on the first board surface 131 side of the engaging portion 43 which protrudes toward the first board surface 131. A predetermined clearance is provided between the lever side facing surface 901 and the first board surface 131.

Figure 5:
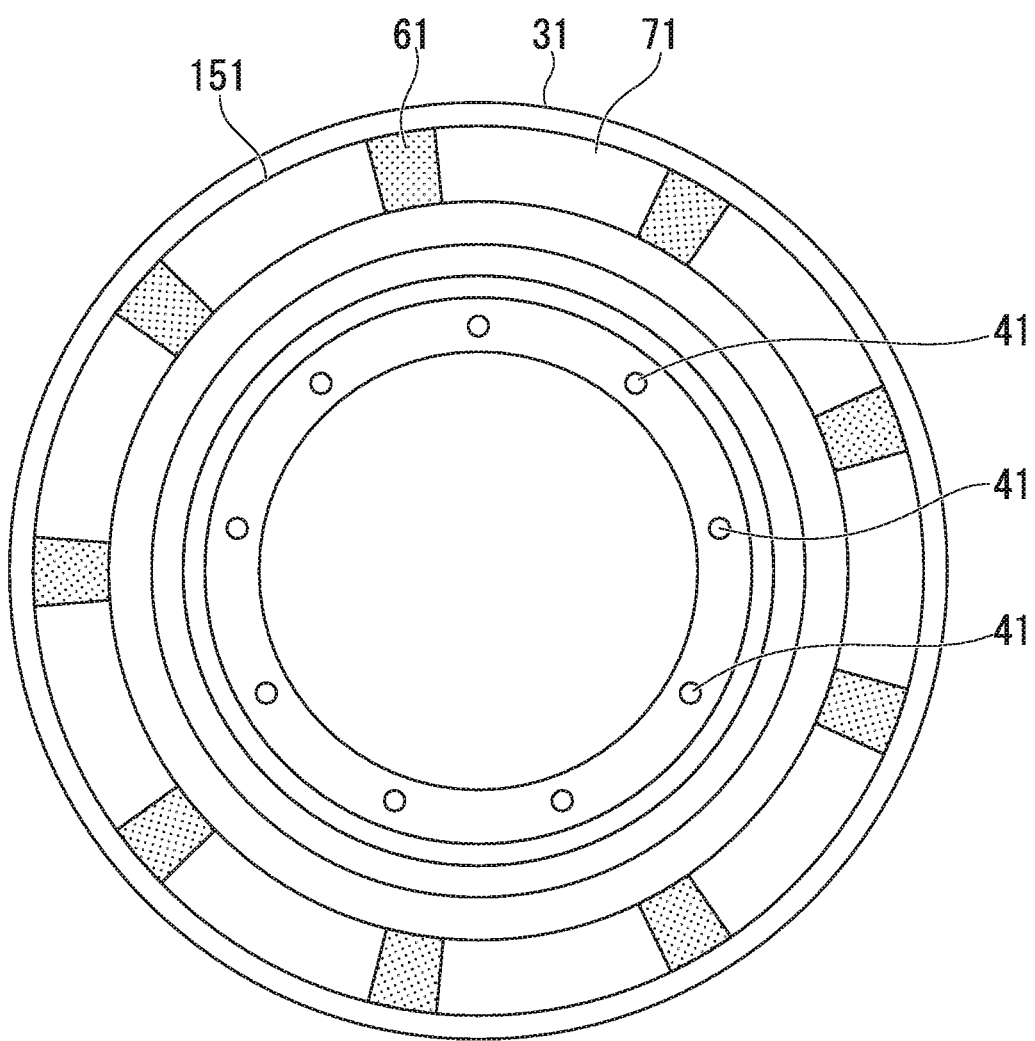
FIG. 5 is a plan view of a nozzle mount according to a first embodiment of the present invention.

As shown in FIG. 5, a plurality of recessed portions 151 that are arranged in the circumferential direction at intervals and recessed from the first board surface 131 are provided in the opposing region on the first board surface 131 to include a region through which the lever side facing surface 901 passes on the first board surface 131 in accordance with the operation of the mechanism (the rotation of the drive ring 40) when seen in plan view. The second surface 71 is provided on a bottom surface, which is an inner surface of the recessed portion 151. Also, the first surface 61 is a surface on the first board surface 131 provided between the recessed portions 151. Thus, the first surface 61 and the second surface 71 are disposed to be arranged alternately in the circumferential direction so as to form an annular shape.

As shown in FIG. 4, the first surface 61 is a surface provided closer to the lever side facing surface 901 in the direction of the axis O1 than the second surface 71. The first surface 61 and the second surface 71 are provided to be arranged adjacent to each other in the circumferential direction and to be equal in number to the vane portions 9. The first surface 61 is provided at a position close to the lever side facing surface 901 in accordance with the relative rotational movement of the drive ring 40 in the direction in which the flow passage area of the exhaust gas flow F is increased by the nozzle vane 92. In other words, the first surface 61 is provided at a position where a clearance in the direction of the axis O1 with respect to the lever side facing surface 901 is minimized when the nozzle vane 92 is disposed at a position of a full opening where at least the flow passage area of the exhaust gas flow passage is maximized. In the present embodiment, a slope portion 151A, which is inclined with respect to the first board surface 131, is formed on the second surface 71, which is also a bottom surface in the recessed portion 151. The slope portion 151A is connected to the first surface 61 to gradually approach the lever side facing surface 901 in the direction of full opening in which the opening of the flow passage of the exhaust gas flow F is increased. In the opposing region of the nozzle mount 31 through which the lever side facing surface 901 passes during the operation of the mechanism, a stepped portion is not formed between the first surface 61 and the second surface 71.

In the variable nozzle mechanism 11 having the above configuration and the turbocharger 1 including the variable nozzle mechanism 11, when the mechanism is operated to open the flow passage of the exhaust gas flow F wider and the nozzle vane 92 is disposed at the position of full opening, the lever side facing surface 901 comes to face the first surface 61 having the smallest clearance. As a result, physical restraint of the lever side facing surface 901 by the first board surface 131 is increased at the position of full opening, so that rattling of the entire lever 93 is reduced. Therefore, a slip amount of the engaging portion 43 with respect to the drive ring 40 is reduced, whereby the wear between the drive ring 40 and the engaging portion 43 is reduced.

Also, in the variable nozzle mechanism 11, the second surface 71 is provided inside the recessed portion 151 to create a clearance difference between the nozzle mount 31 and the lever 93. Therefore, by using a relatively simple process such as cutting the board surface of the nozzle mount 31 formed by forging or the like, a region where the clearance is different in the circumferential direction can be processed, and addition of a new member is not required.

In addition, since the slope portion 151A is formed such that a stepped portion is not formed between the first surface 61 and the second surface 71, the mechanism can be smoothly operated.

With the operation and effects described above, the variable nozzle mechanism 11 according to the first embodiment of the present invention and the turbocharger 1 including the variable nozzle mechanism 11 can significantly improve the wear resistance when the nozzle vane 92 is disposed at the position of full opening.

Second Embodiment

Figure 6:
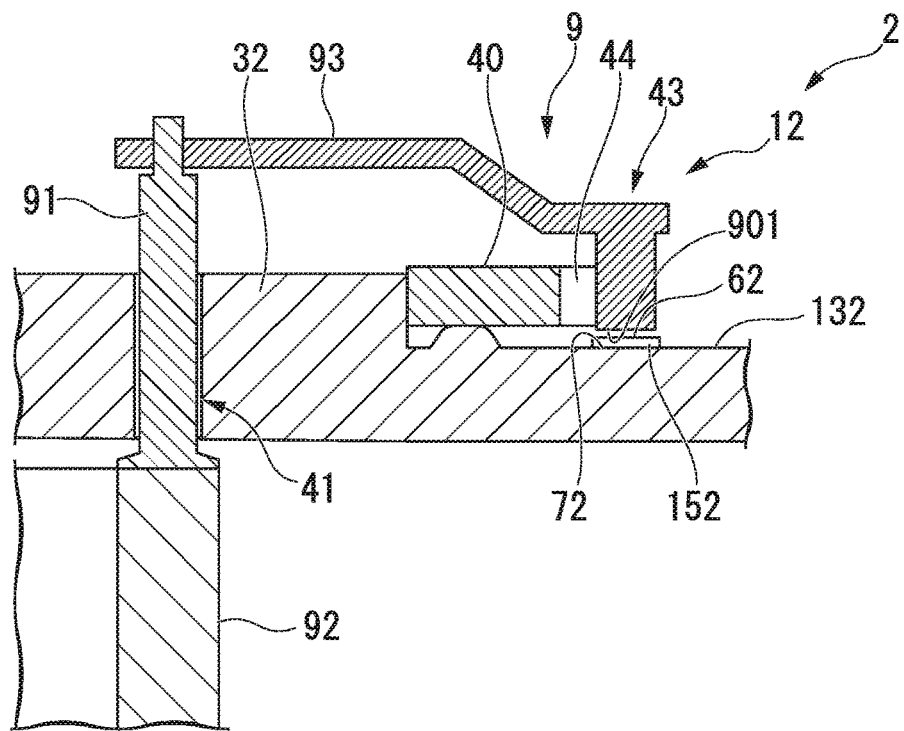
FIG. 6 is a view of a variable nozzle mechanism according to a second embodiment of the present invention, which corresponds to the cross-sectional view taken along the line A-A in FIG. 2.

Next, a second embodiment will be described with reference to FIG. 6. In the second embodiment, the same components as those of the first embodiment are denoted by the same reference numerals, and a detailed description thereof will be omitted.

The second embodiment is different from the first embodiment in the configuration of the nozzle mount 32.

On the first board surface 132, a plurality of protruding portions 152 that are arranged in the circumferential direction at intervals are provided. A first surface 62 that is closest to the lever side facing surface 901 in the opposing region is provided on a top surface (a surface) of the protruding portion 152. A second surface 72 is provided between the protruding portions 152.

In the variable nozzle mechanism 12 having the above configuration and the turbocharger 2 including the variable nozzle mechanism 12, the protruding portion 152 required for providing the first surface 62 for reducing the clearance can be provided not only integrally with the nozzle mount 32, but can also be designed and manufactured as a separate part from the nozzle mount 32. Therefore, even when wear of the protruding portion 152 has progressed, performance can be recovered by replacing only the protruding portion 152.

Third Embodiment

Figure 7:
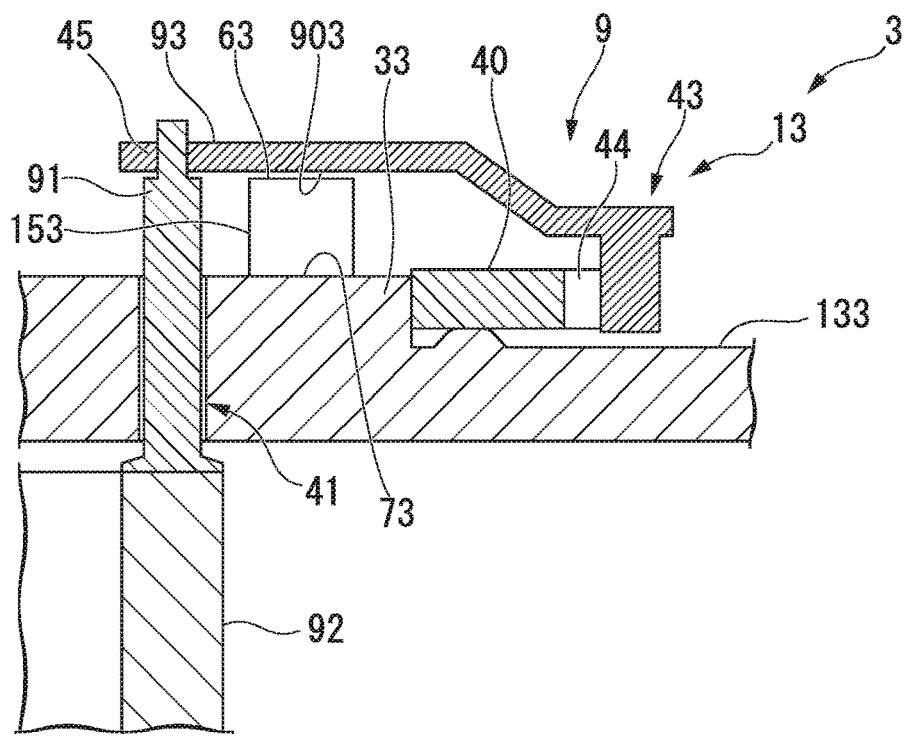
FIG. 7 is a view of a variable nozzle mechanism according to a third embodiment of the present invention, which corresponds to the cross-sectional view taken along the line A-A in FIG. 2.

Next, a third embodiment will be described with reference to FIG. 7. In the third embodiment, the same components as those in the first embodiment and the second embodiment are denoted by the same reference numerals, and a detailed description thereof will be omitted.

The third embodiment is different from the first embodiment in the configuration of the lever 93 and the nozzle mount 33.

The lever 93 in the present embodiment has a lever side facing surface 903 between the engaging portion 43 and a fixing portion 45 for fixing the vane shaft 91 at the radially inner end portion. Protruding portions 153 having the same configuration as the protruding portions 152 are provided to protrude from the nozzle mount 33 at a radially inward side of a first board surface 133 toward the lever side facing surface 903. That is, as compared with the second embodiment, the plurality of protruding portions 153 are provided at positions shifted radially inward on the nozzle mount 33. A first surface 63 is provided on a top surface of the protruding portion 153, and a second surface 73 is provided between the protruding portions 153.

In the variable nozzle mechanism 13 having the above configuration and the turbocharger 3 including the variable nozzle mechanism 13, since the lever side facing surface 903 is provided radially inward from the nozzle mount 33, an area of the first surface 63 provided for suppressing the vibration transmitted through the vane shaft 91 can be reduced. That is, the processing area of the first surface 63 (the installation area of the protruding portion 153) becomes relatively small. Therefore, it is possible to obtain a wear resistance effect at the engaging portion 43 by processing only the nozzle mount 31 in a relatively narrower region than in the first embodiment and the second embodiment.

Fourth Embodiment

Figure 8:
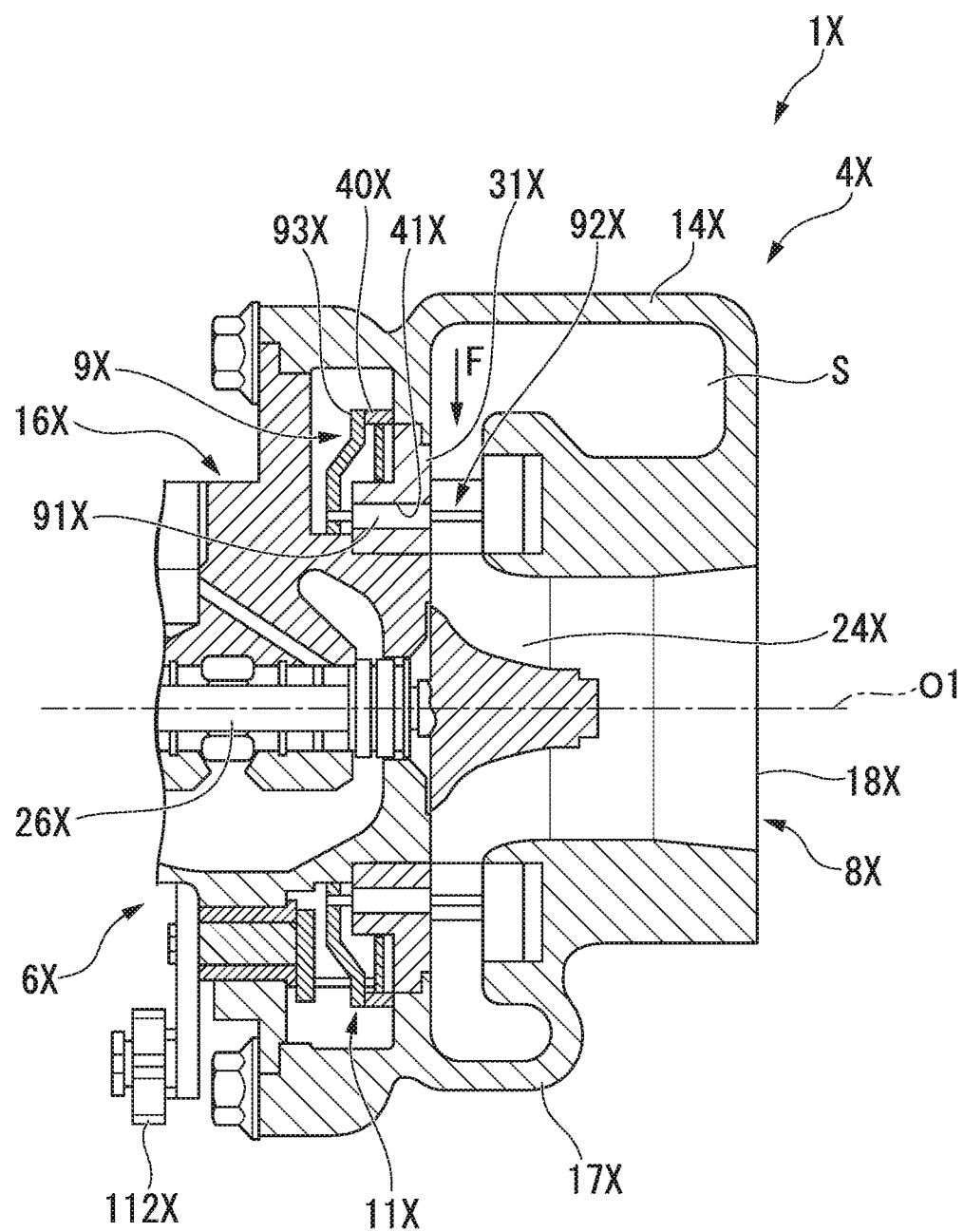
FIG. 8 is a longitudinal cross-sectional view of a turbocharger having a variable nozzle mechanism according to a fourth embodiment of the present invention.

Next, fourth embodiment will be described with reference to FIG. 8. In the fourth embodiment, the same components as those of the first embodiment are denoted by the same reference numerals, and a detailed description thereof will be omitted.

The fourth embodiment is different from the first embodiment in the configuration of a turbocharger 1X. The turbocharger 1X according to the fourth embodiment includes a turbine section 4X which has a turbine casing 14X and a turbine rotor 24X in the turbine casing 14X, a compressor section 5X (not shown in FIG. 8), a shaft section 6X which has a bearing housing 16X and a turbine shaft 26X in the bearing housing 16X, and an operation section 10 (not shown in FIG. 8).

The turbine shaft 26X is supported by the bearing housing 16X to be rotatable about a rotational axis (axis O1). The turbine casing 14X is provided to cover a periphery of the turbine rotor 24X. The turbine casing 14X is integrally connected to the bearing housing 16X.

In addition to the turbine rotor 24X, the turbine section 4X has a scroll 17X integrally formed with the turbine casing 14X, an exhaust gas outlet portion 8X formed with an exhaust gas outlet 18X, and a variable nozzle mechanism 11X provided inside the turbine casing 14X.

The variable nozzle mechanism 11X includes a nozzle mount (a first annular member) 31X, a drive ring (a second annular member) 40X, and a vane portion 9X.

The nozzle mount 31X is substantially disc-shaped and has an annular shape with a circular opening at the center thereof. The nozzle mount 31X is provided at a position close to the bearing housing 16X in the direction of the axis O1 with respect to the scroll 17X in the turbine casing 14X. In other words, the nozzle mount 31X is disposed on the side opposite to the direction of the axis O1 across the passage (the fluid flow channel) of the exhaust gas flow F as compared with the nozzle mount 31 of the first embodiment. Also, in the nozzle mount 31X, a plurality of support holes 41X which penetrate the nozzle mount 31 in the thickness direction are continuously formed.

The drive ring 40X is supported by the nozzle mount 31X and is provided in a space that is not exposed to the exhaust gas. Specifically, the drive ring 40X is disposed in a space surrounded by the nozzle mount 31X, the turbine casing 14X, and the bearing housing 16X.

Further, the drive ring 40X is connected to the conversion mechanism 112X via a pin or the like. The conversion mechanism 112X is a part of the operation section 10 that operates the variable nozzle mechanism 11X from the outside of the turbine casing 14X.

The vane portion 9X has a plurality of vane shafts 91X, a plurality of nozzle vanes 92X, and a plurality of levers 93X.

The vane shafts 91X are inserted into the support holes 41X one by one. Each vane shaft 91X is supported by the support hole 41X to be relatively rotatable with respect to the nozzle mount 31X with the center axis of the support hole 41X as a rotational axis (a shaft rotation axis).

Each nozzle vane 92X is fixed to one end of each vane shaft 91X. The nozzle vane 92X is provided midway in the passage of the exhaust gas flow F. That is, the position where the nozzle vanes 92X are arranged is a region facing the exhaust gas flow F, like the nozzle vanes 92 of the first embodiment. The nozzle vanes 92X are fixed in a one-to-one relationship with the respective vane shafts 91X. The exhaust gas flow F sent from a space of the scroll 17X passes through gaps of the nozzle vanes 92X and flows to the turbine rotor 24X. The nozzle vanes 92X are provided to be rotatable with respect to the nozzle mount 31X, and are capable of adjusting a flow passage area of the exhaust gas flow F.

Each lever 93X is a plate-shaped member which extends in a radial direction of the nozzle mount 31X. One end of each lever 93X is engaged with the drive ring 40X. The other end of each lever 93X is fixed to the other end of the vane shaft 91X.

Also in the variable nozzle mechanism 11X of the fourth embodiment having the above-described configuration and the turbocharger 1X including the same, as with the first embodiment, it is possible to further improve the wear resistance while suppressing an increase in cost.

Although the first to fourth embodiments of the present invention have been described in detail with reference to the drawings, specific configurations are not limited to these embodiments, and also include design changes in a range not departing from the gist of the present invention.

For example, the slope portion 151A and the first surfaces 61, 62, and 63 in each embodiment may be connected by a smooth curved surface, and the plurality of first surfaces 61, 62, and 63 and the plurality of second surfaces 71 and 72 may be provided to be continuous. Also, the slope portion 151A may not necessarily be provided. In this case, the first surface and the second surface on a plane along the first board surface 131 (132, 133) are alternately arranged in the circumferential direction and are provided in an uneven shape.

Also, the recessed portion 151 in the first embodiment, the protruding portion 152 in the second embodiment, and the protruding portion 153 in the third embodiment may be formed directly on the nozzle mount 31 and may be provided integrally with the nozzle mount 31 or provided as a separate component from the nozzle mount 31. Not only the first surface 62 but also the second surface 72 may be provided on the surface of the protruding portion 152 in the second embodiment. The same applies to the protruding portion 153 in the third embodiment.

Further, in the above-described embodiments, as an example of a rotating machine, a case where the variable nozzle mechanism 11 (12, 13) is applied to the variable capacity turbocharger 1 (2, 3) has been described. However, the variable nozzle mechanism 11 (12, 13) can also be applied to other rotating machines such as an inlet guide vane of a compressor, etc.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

As long as the variable nozzle mechanisms 11, 12, 13, 11X are arranged inside the turbine casing 14, 14X, their positions are not limited to the positions of the above-described embodiments. For example, the variable nozzle mechanisms 11, 12, 13 may be disposed so that the vanes 92 are sandwiched between an independent separate member that is detachably fixed to the nozzle mount 91 in the turbine casing 14 and the nozzle mount 31.

EXPLANATION OF REFERENCES 1, 2, 3 Turbocharger (rotating machine)
4, 4x Turbine section
5 Compressor section
6, 6X Shaft section
8, 8X Exhaust gas outlet portion
9, 9X Vane portion
10 Operation section
11, 12, 13, 11X Variable nozzle mechanism
14, 14X Turbine casing
14A Turbine casing first partition wall
14B Turbine casing second partition wall
15 Compressor housing
16, 16X Bearing housing
17, 17X Scroll
18, 18X Exhaust gas outlet
24, 24X Turbine rotor
25 Compressor wheel
26, 26X Turbine shaft
31, 32, 33, 31X Nozzle mount (first annular member)
40, 40X Drive ring (second annular member)
41, 41X Support hole
42 Pin
43 Engaging portion
44 Recessed portion
45 Fixing portion
61, 62, 63 First surface
71, 72, 73 Second surface
91 Vane shaft
92 Nozzle vane
93 Lever
110 Actuator
111 Actuator rod
112, 112X Conversion mechanism
131, 132, 133 First board surface
141 Second board surface
151 Recessed portion
151A Slope portion
152, 153 Protruding portion
901, 903 Lever side facing surface
F Exhaust gas flow
O1 Axis
S Space

What is claimed is:

1. A variable nozzle mechanism, comprising:
a first annular member;
a plurality of nozzle vanes which are provided to face the first annular member, disposed in an annular fluid flow channel for guiding a working fluid from a scroll flow channel formed on an outer circumferential side of a turbine rotor to the turbine rotor, rotatable relative to the first annular member, and configured to adjust the flow passage area of the fluid flow channel;
a plurality of vane shafts which are inserted through support holes penetrating through the first annular member and support the respective nozzle vanes one by one;
a plurality of levers which are disposed outside the fluid flow channel and extend from the respective vane shafts radially outward of the first annular member; and
a second annular member which is provided to be rotatable with respect to the first annular member around a central axis of the first annular member to support the plurality of levers, and rotates the nozzle vanes together with the levers relative to the first annular member,
wherein a circumferential direction of the first annular member is the same as a rotation direction of the second annular member,
wherein each of the levers has a lever side facing surface which faces the first annular member in the direction of the central axis, and
wherein the first annular member has a first surface which has a minimum clearance in the direction of the central axis with respect to the lever side facing surface in an opposing region that faces the lever side facing surface in the direction of the central axis, and a second surface which is disposed adjacent to the first surface in the circumferential direction of the first annular member and has a clearance in the direction of the central axis with respect to the lever side facing surface that, when the lever side facing surface faces the second surface, is greater than the clearance in the direction of the central axis between the first surface and the lever side facing surface.

2. The variable nozzle mechanism according to claim 1, wherein the first surface and the second surface are arranged alternately in the circumferential direction so as to form an annular shape.

3. The variable nozzle mechanism according to claim 1, wherein a recessed portion which is recessed in the direction of the central axis is provided in the opposing region of the first annular member, and
the second surface is provided on an inner surface of the recessed portion.

4. The variable nozzle mechanism according to claim 1, wherein a protruding portion which protrudes in the direction of the central axis and is separate from or integral with the first annular member is provided in the opposing region of the first annular member, and
the first surface is provided on a surface of the protruding portion.

5. The variable nozzle mechanism according to claim 1, wherein the lever further includes an engaging portion which is engaged with and supported by the second annular member at an outer end portion in the radial direction, and
the lever side facing surface is provided in the engaging portion.

6. The variable nozzle mechanism according to claim 1, wherein the lever further comprises:
an engaging portion which is engaged with and supported by the second annular member at an outer end portion in the radial direction, and
a fixing portion which fixes the vane shaft at an inner end portion in the radial direction, and
the lever side facing surface is provided between the engaging portion and the fixing portion.

7. The variable nozzle mechanism according to claim 1, wherein the first surface is provided along the lever side facing surface, and
the second surface gradually approaches to the lever side facing surface to be connected to the first surface as it goes toward a front side in a rotational direction of the second annular member which is a direction in which an opening of a nozzle vane of the plurality of nozzle vanes increases.

8. A rotating machine comprising the variable nozzle mechanism according to claim 1.

9. The variable nozzle mechanism according to claim 1, wherein when the nozzle vanes are arranged at the position of full opening, the lever side facing surface faces the first surface.

* * * * *